(12) United States Patent
Elberbaum (10) Patent No.: US 7,453,686 B2
(45) Date of Patent: Nov. 18, 2008

(54) METHOD AND APPARATUS FOR ATTACHING DISPLAY PANELS ONTO WALL SURFACE

(75) Inventor: David Elberbaum, Tokyo (JP)

(73) Assignee: Elbex Video Limited, Tokyo (JP)

(*) Notice: Subject to any disclaimer, the term of this patent is extended or adjusted under 35 U.S.C. 154(b) by 703 days.

(21) Appl. No.: 11/214,452

(22) Filed: Aug. 29, 2005

(65) Prior Publication Data
US 2007/0046837 A1    Mar. 1, 2007

(51) Int. Cl.
*H05K 7/00*    (2006.01)

(52) U.S. Cl. ..................... 361/681; 345/905

(58) Field of Classification Search .......... 345/903–905
See application file for complete search history.

(56) References Cited

U.S. PATENT DOCUMENTS

| | | | |
|---|---|---|---|
| 5,404,271 A | | 4/1995 | Satou et al. |
| 6,059,242 A | * | 5/2000 | Lefevre et al. .......... 248/292.13 |
| 6,068,227 A | | 5/2000 | Morgan et al. |
| 6,189,850 B1 | * | 2/2001 | Liao et al. .............. 248/292.14 |
| 6,559,829 B1 | * | 5/2003 | Matsuo et al. ............... 345/156 |
| 7,170,741 B2 | | 1/2007 | Cho et al. |
| 7,180,731 B2 | | 2/2007 | Titzler et al. |
| 7,320,451 B2 | * | 1/2008 | Ogawa ......................... 248/161 |

OTHER PUBLICATIONS

International Search Report and the Written Opinion of the International Search Authority dated Aug. 1, 2008, from the corresponding International Application.

* cited by examiner

*Primary Examiner*—Duc Q Dinh
(74) *Attorney, Agent, or Firm*—Katten Muchin Rosenman LLP

(57) ABSTRACT

A method for attaching a flat screen display device onto a flat surface using a surface mounted holder is disclosed. The holder includes a plurality of springy electrical contacts and a plurality of hooks each having a latch. The rear surface of the display device includes corresponding electrical contacts for corresponding with the plurality of springy electrical contacts and sockets each with a convex area corresponding to the hooks each having a latch. The method includes mounting the sockets onto the hooks and pushing the display device toward the flat surface by overcoming a biasing force of the springy contacts; and sliding the display device in a direction opposite to the direction of the hooks until the springy electrical contacts engage the corresponding electrical contacts and every convex area is latched by every latch, and is secured by the biasing force for preventing accidental release of the display device.

12 Claims, 9 Drawing Sheets

METHOD AND APPARATUS FOR ATTACHING DISPLAY PANELS ONTO WALL SURFACE

BACKGROUND OF THE INVENTION

1. Field of Invention

This invention relates to the mounting and the connection of flat screen displays such as CRT, LCD, PDP (Plasma Display Monitors) and other flat screen display devices and to the mounting and connection of video interphone monitors used in video interphone systems.

2. Description of the Prior Art

Flat screen display devices such as television receivers, PC displays and monitors are mounted on walls using brackets and holders for attaching the display devices at a distance such as 5 cm~10 cm (2"~4") away from the wall, allowing for a space for the connection of cables and their connectors, such as power, video and audio connectors, to the device. The mounts, holders, fixtures and the cables behind the display device are visible and are non-pleasing to the interiors of apartments or offices were they are installed.

Display devices such as surface mounted video interphone monitors are firmly attached to the wall surface using screws or other fasteners. Other recess mounted video interphone monitors are attached to a back box (embedded into a wall) for recess mounting the video interphone monitors into the wall. In all such video interphone monitor units the cables are connected to terminals inside the video interphone device and its cover is secured by screws to the device itself or to the back box. The screws holding the device cover or the device itself to the back box are non-pleasing to the interior decoration and are objected by architects and interior designers. Moreover, to remove for servicing any of the prior art flat screen display devices and/or the video interphone monitors call for disconnection of the wires, cable and plugs and the mechanical disassembly of the device from the mounts, holders, fixtures, the wall and/or the back boxes, which is time consuming and cumbersome.

SUMMARY OF THE INVENTION

It is an object of the present invention to provide a method and apparatus for attaching flat screen display device, such as CRT, LCD, plasma display, LEDs or other flat screen display devices included in apparatuses such as PC display, data display, graphic display, picture display, television receivers, video monitors, video interphone, video conferencing, video telephone, shopping terminals and a combination thereof, onto walls or other flat surfaces and/or into back boxes, buried into walls or other flat surfaces, without visible mounting screws and/or other visible fixing holder, visible fixtures and/or other visible fasteners.

Another objects of the present invention is to provide the holder with springy contacts for connecting all the electrical and signal lines to the flat screen display device or the video interphone unit through a reciprocal contacts affixed onto the rear surface of the flat screen display device or of the video interphone unit, thereby enabling the removal or the attaching of the display device or the video interphone unit without the need to connect or disconnect individual wires or connectors to and from the display device or the video interphone unit itself. The resile force of the springy contacts also provide the force for latching the display device to latching hooks for preventing accidental release of the display device from its holder.

Another object of the present invention is to provide an embedded back box for installation into walls or other flat surfaces and for attaching a retractable holder onto a spring guided mount plate, through a set of springs extended from the holder into the spring guided mount plate, thereby providing for tightly attaching the display unit, by a spring action onto the wall surface, without the use of visible screws or other fasteners and/or visible fixtures.

BRIEF DESCRIPTON OF THE DRAWINGS

The foregoing and other objects and features of the present invention will become apparent from the following description of preferred embodiments of the invention with reference to the accompanying drawings, in which:

FIGS. 1A and 2A are perspective views of the mounting of a surface type display device of the preferred embodiment of the invention.

DETAILED DESCRIPTION OF THE PREFERRED EMBODIMENT

Figure 1A:
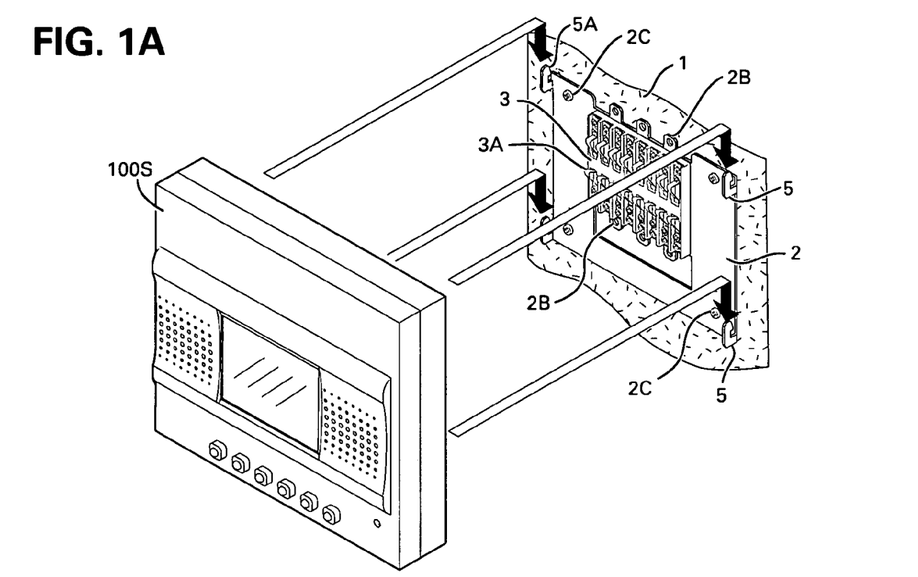

FIG. 1A shows a flat screen display 100S for surface mounting onto a surface mount 2. A display device in the following description may be flat screen displays such as CRT (cathode ray tube), LCD (liquid crystal display), PDM (plasma display monitor) or LED (light emitting diodes) as used in PC display monitors, or video monitors, or television receivers, or video interphone monitor station, video telephone devices, video conferencing terminals or shopping terminals or other display devices used for displaying data, graphics, pictures and a combination thereof. Surface display device in the following description is a display device 100S shown in FIG. 1A for mounting onto a wall or other flat surfaces such that its entire body protrudes from the surface. Recess display device in the following description is a display device 100R shown in FIG. 2A for mounting onto a wall or other flat surfaces such that the rear portion of the display device is buried into a cutout in the surface or into a rear box 6 embedded into the wall or the flat surface with only the front frame and/or the front portion of the display device is protruding from, or aligned with the surface. A wall in the following description may be a wall, pole, partition, framework, skeletal structure, fence, bulkhead or any other flat surface occupied by the display device 100S or the recess display device 100R.

Figure 1B:
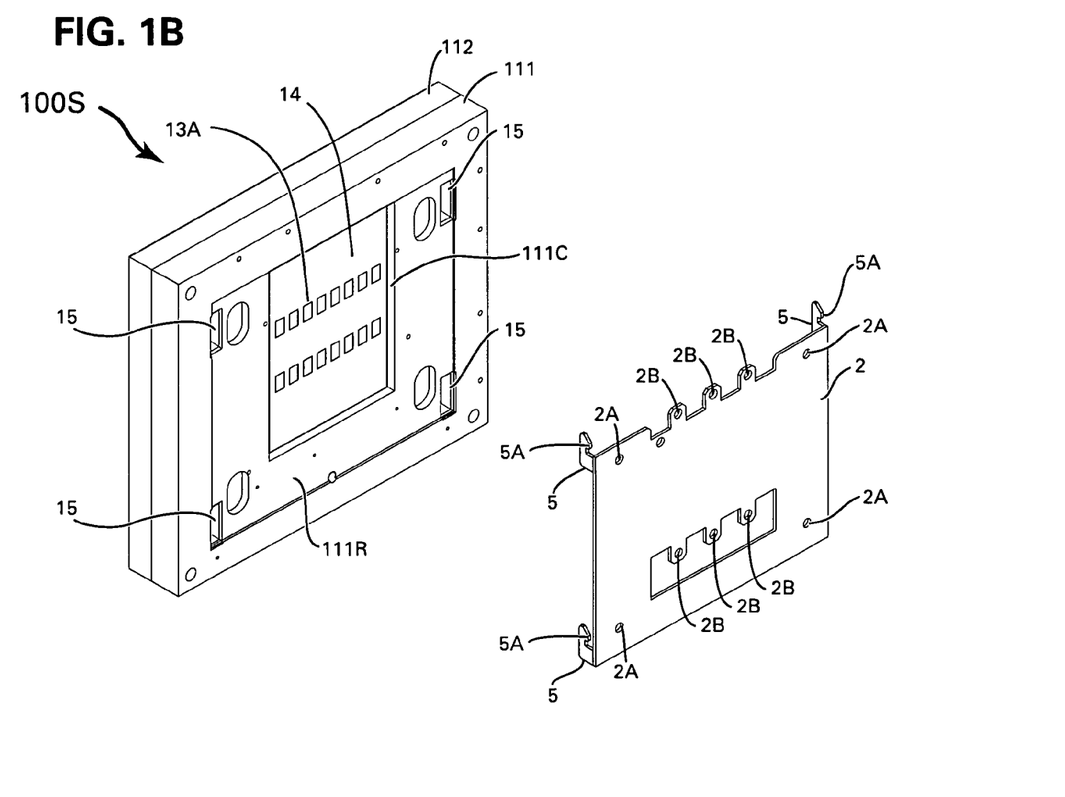

The holder 2 of FIG. 1A including four latching hooks 5 and a springy contact assembly 3 is shown attached to a wall 1 by the screws 2C through the mounting holes 2A shown in FIG. 1B. The two sets of three holes 2B shown on top and under the springy contact assembly 3, are for mounting the holder onto an electrical box, which is well known as a single or dual gang box. The electrical box (not shown) contains the electrical and signal wires, which are connected to the respective contacts 3A of the springy contact assembly 3. At last two electrical springy contacts are needed to provide for one electrical circuit. When the electrical box is not used an electrical pipe or other type of conduit can carry the wires to the springy contact assembly 3. As shown in FIG. 1B the four sockets 15 of the rear surface 111R of the display device 100S or of the display device 100R of FIG. 2B are complementary to the four hooks 5 of the holders 2 or 2R and as shown in FIGS. 3A, 3B and 3C when the display device 100S with its sockets 15 are aligned with (FIG. 3A) and pushed onto the hooks 5 (FIG. 5B) and slide downwards (FIG. 5C), the bosses or convexes 15A inside the sockets 15 will lock the display device into the latches 5A of the hooks 5. The bosses or bars 15A are shown as semi circled convexes but can be formed into shapes such as rectangular or triangle or any other matching shapes corresponding to the latches 5A of the hooks 5.

The expanded springy contacts 3A of the contacts assembly 3 of FIG. 3A, are shown compressed 3AA in FIG. 3B and engage a set of complementary contacts 13A (shown in FIG. 3C), assembled or embedded onto the rear surface 111R of the display device 100S or 100R. The compressed contacts 3AA shown in FIG. 3C force the entire display device 100S or 100R away from the holder 2, thereby firmly securing the convexes 15A of the sockets 15 to the latches 5A of the hooks 5 for preventing accidental release of the display device 100S or 100R from the holder 2.

The contacts 13A of the preferred embodiment are plated surfaces of a copper pattern of a printed circuit board 14 mounted on the inner side of the rear cover 111 of the display devices 100S and 100R and are accessed through a cutout 111C for accommodating the size and thickness of the contacts assembly 3. However different types of fixed mounted or embedded electrical contacts can be used instead.

The springy contacts 3A, the hooks 5 and the sockets 15 are all shown extended vertically, with the hooks directed upwards for attaching the display devices 100S or 100R by mounting the sockets 15 onto the hooks 5 and by pushing the display device against the springy contacts 3A and for locking the display device to the holder 2 by sliding the display device downward such that the convexes 15A are latched by the latches 5A of the hooks 5. However it is obviously possible to extend the springy contacts 3A, the hooks 5 and the sockets 15A vertically in the opposite direction (upside down) thereby latching the display devices 100S or 100R to the holder by sliding it upwards. It is similarly possible to extend the sockets 15, the springy contacts assembly 3 and the hooks 5 sideways to the left or the right thereby latching the display devices sideways to the left or right. Such sideways or upward latching provides for engaging the springy contacts 3A with the complementary contacts 13A and for securing the display devices 100S or 100R to the holders 2 or 2R, similarly to the process shown in FIGS. 3A, 3B and 3C, but in opposite direction (upwards) or left-right direction (sideway).

Similarly, it is becoming clear that the springy contacts 3A provide the electrical and signal interconnection between the holders 2 or 2R and the display devices 100S or 100R and the resile force for securing the convexes 15A of the display device 100S or 100R to the latches 5A of the hooks 5 of the holders 2 or 2R.

Though the shown preferred embodiment of FIGS. 1A and 1B include four hooks 5, four sockets 15 and a single contacts assembly 3, it is similarly possible to employ two hooks 5, for example around the vertical center of the holder 2 and extend two contacts assembly 3 one the top and the other on the bottom of the holder 2 (not shown), or it is possible to employ three or six hooks 5 and any number of contact assemblies 3, to accommodate a variety of display device sizes, shapes, weight and structure, by providing complementary contacts 13A and sockets 15 on a rear surface of corresponding display devices.

Figure 2A:
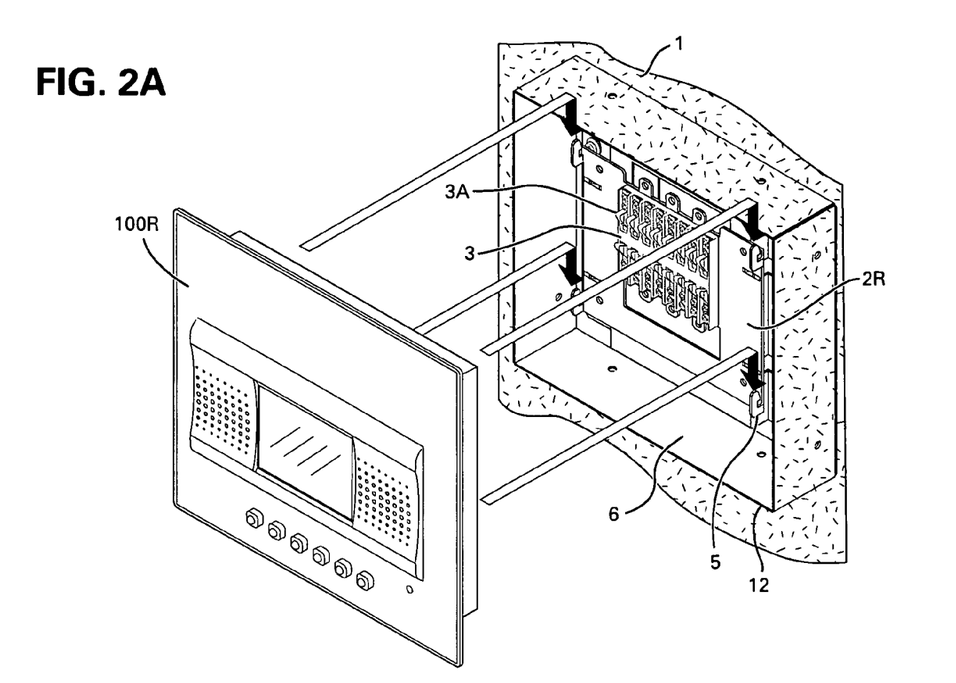
FIGS. 2A and 2B are perspective views of the mounting of a recess type display device of the preferred embodiment of the invention.
Figure 2B:
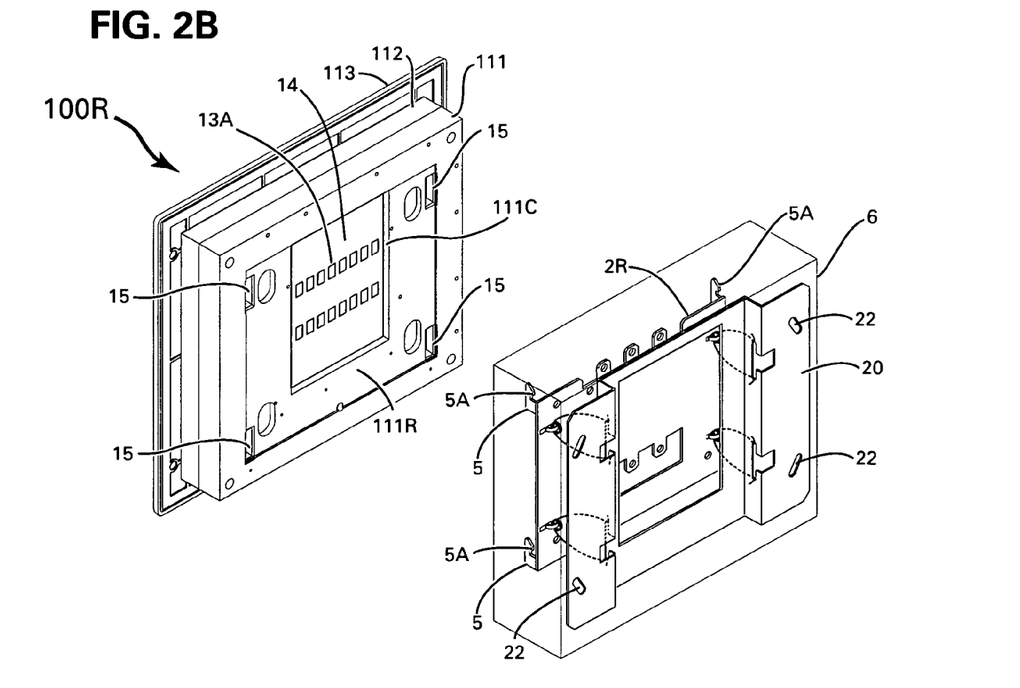
Figure 3A:
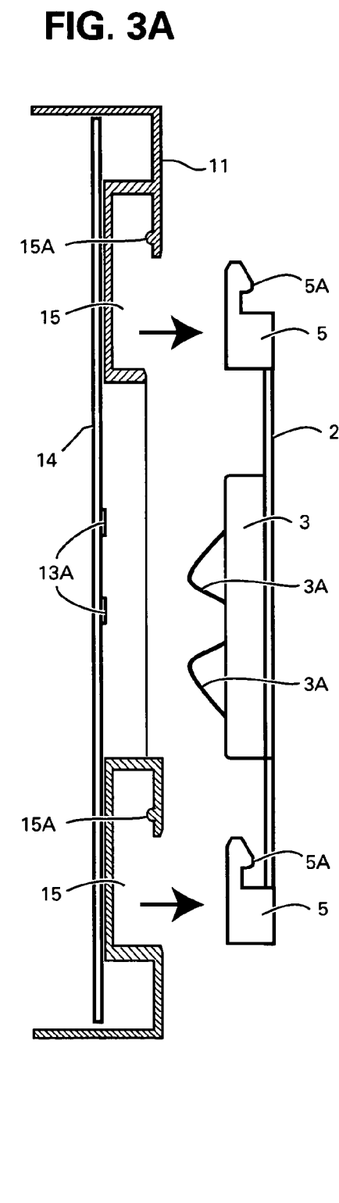
FIGS. 3A, 3B and 3C are sectional views showing the latching method of the preferred embodiment, using the springy contact assembly and the latching hooks of the present invention.
Figure 3B:
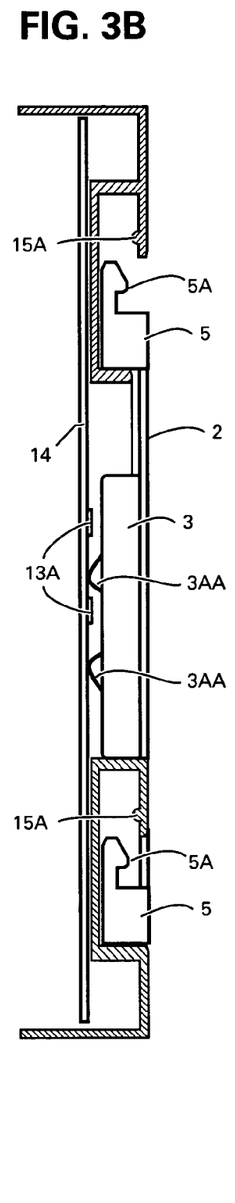
Figure 3C:
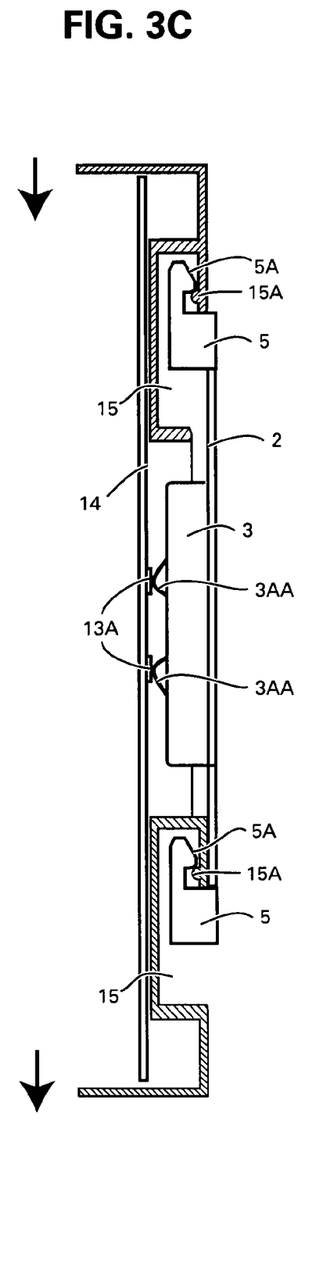

FIGS. 2A and 2B show a recess display device 100R, which is similar to the surface display device 100S of FIGS. 1A and 1B with the exception of the rim or frame 113 surrounding the front cover 112 of the display device 100R. The rim 113, as will be explained later, should be tightly forced onto the wall 1 and cover the mounting box and its surrounding edges. Otherwise, the retractable holder 2R shown in FIGS. 2A and 2B is similar to the holder 2 of the FIGS. 1A and 1B with the exception of the semi circled hooks 2H for attaching the retractable holder 2R to the spring guide plate 20 shown in FIG. 4A through four springs 21, instead of the holder 2 that is attached to a wall 1 using the screws 2C through the holes 2A. The mounting steps of the recess display device 100R onto the retractable holder 2R are same as the mounting steps of the surfaced display device 100S onto the holder 2.

Figures 4A, 4B:
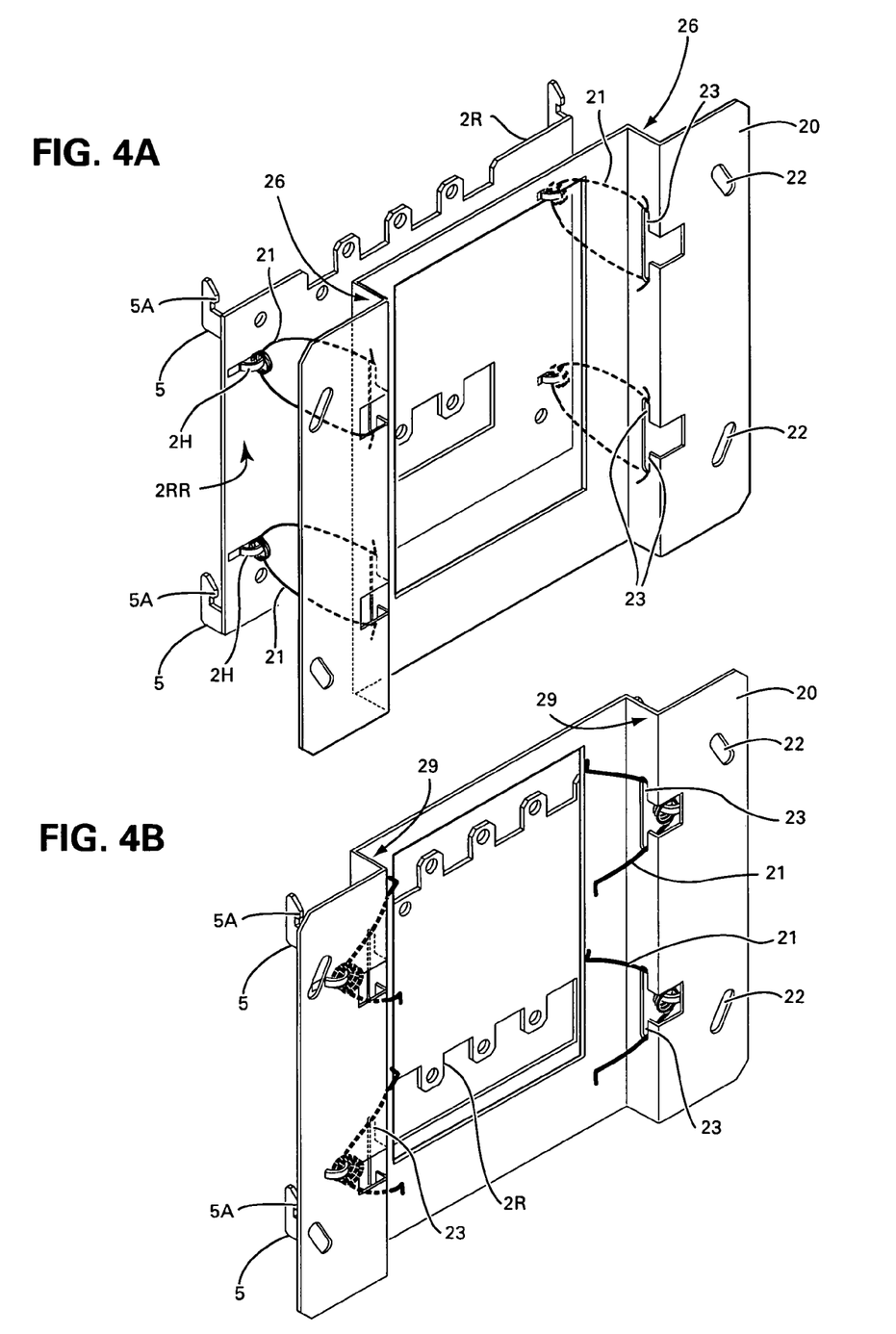
FIGS. 4A and 4B are perspective views of the retractable holder attached to a spring guided mount plate in its pull out and pushed back positions.
Figure 5A:
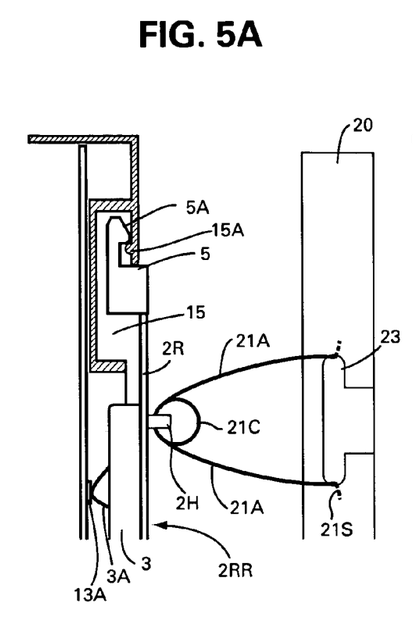
FIGS. 5A, 5B and 5C are sectional views of the holder with the spring guided mount plate in pull out and pushed back positions and the side and front views of the springs.
Figure 5B:
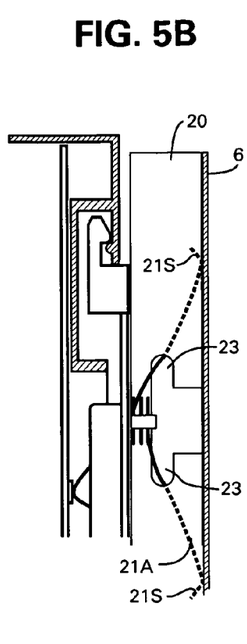
Figure 6A:
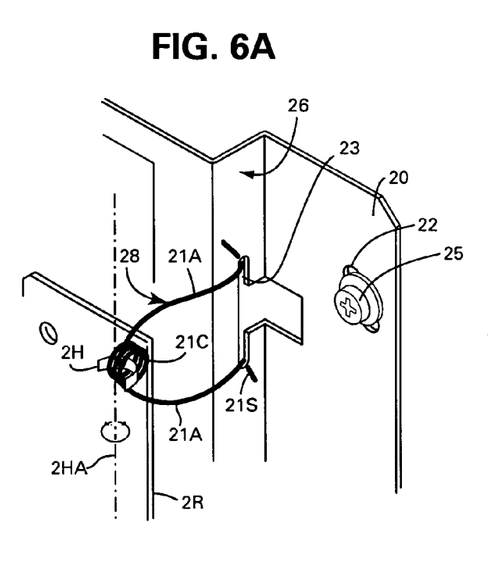
FIGS. 6A and 6B are perspective views of the spring and the spring slot of the spring guided mount plate of FIGS. 5A and 5B.
Figure 6B:
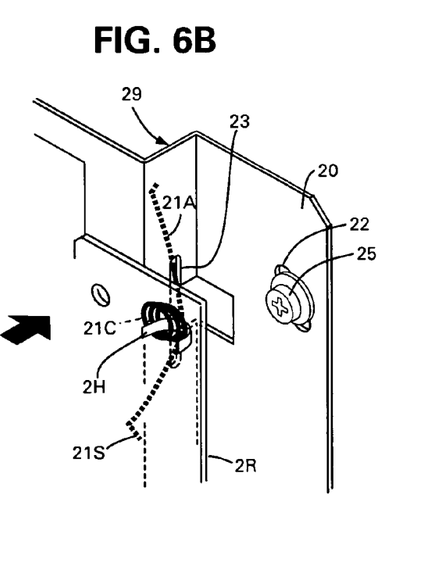
Figure 7A:
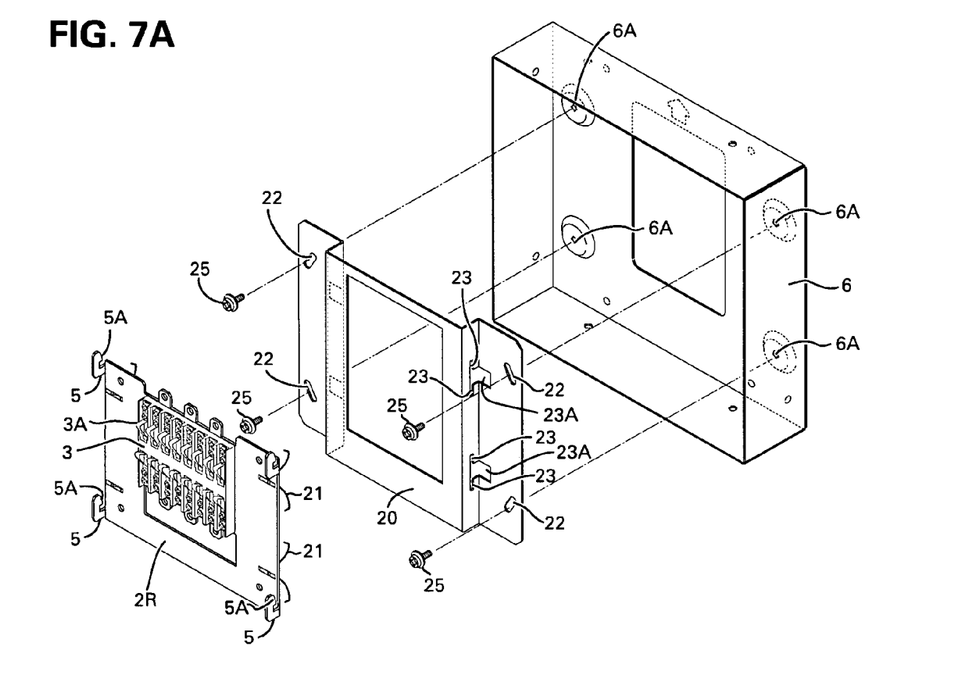
FIGS. 7A, 7B and 7C are exploded view and perspective views of the holder in its pull out and pushed back positions within the recess mounting box.

Shown in FIG. 4A is the retractable holder 2R supported by four extended springs 21 that are attached to the retractable holder 2R by four semi circled hooks 2H at the rear surface 2RR of the retractable holder 2R. The springs 21 comprising coil portion 21C and two expanded arms 21A, each terminated with a stopper 21S. The semi circled hooks 2H for attaching the coil 21C of the spring 21 provide free rotation to the spring 21 around the axis 2HA of the semi circle as shown in FIG. 6A. The two arms 21A of each of the four springs 21 are supported by four slots 23 of the spring guide plate 20 shown in FIGS. 4A, 4B, 5A, 5B, 6A and 6B. The spring guide plate 20 is attached to the recess mounting box 6 of FIG. 7A using four screws 25 to become the fixed supporting fixture for the retractable holder 2R, which can be pulled out or pushed back into the mounting box 6 through the four extended springs 21 shown in FIGS. 7B and 7C. The cutouts 23A in the spring guide plate 20 shown in FIG. 7A are provided for simplifying the assembly of the springs 21 into the slots 23.

The recess mounting box 6 of FIG. 2A is shown embedded into the wall 1 with its rim 12 aligned with the wall surface. In practice however embedded or buried mounting boxes are not perfectly aligned with the walls, nor are they perfectly leveled. The exploded view of the box 6 and the spring guide plate 20 shown in FIG. 7A illustrates how the level of the spring guide plate 20 can be adjusted through the angled oval shaped screw holes 22, which provide for correction of the holder levelness of up to several degrees, such as ±3° by adjusting the spring guide plate 20 inside (a non leveled) embedded box 6, using the locking screws 25, also shown in FIGS. 6A and 6B, to lock the spring guide plate into its adjusted position. While the mounting box 6 should not be installed protruding out from the wall surface 1, the box 6 is commonly installed buried inside the wall, with its rim 12 imperfectly aligned with the wall surface 1. To compensate for the non evenness of the box 6 with the wall surface 1, the four springs 21 extended between the retractable holder 2R and the spring guide plate 20 provide the needed flexible attachment method of the display device 100R to the wall surface 1, without the use of any visible screws, fasteners or fixtures.

Figure 5C:
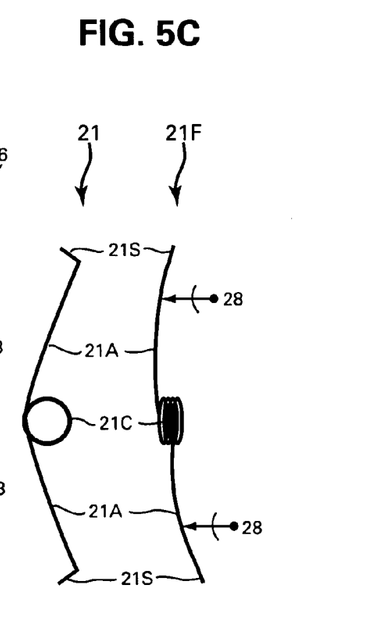

The coil 21C of the spring 21 of FIG. 5C, shown fully recoiled, is supported by the semi circle hook 2H at the back 2RR of the retractable holder 2R and as explained above the semi circle hook 2H provides free movement to the spring 21 around the axis 2HA of the semi circle plane. By such movement the spring 21 can be drawn out from the slot 23 to almost perpendicular position versus the holder 2R, as shown in FIG. 5A and FIG. 6A, or can be pushed back into almost parallel position with the retractable holder 2R as shown in FIG. 5B and FIG. 6B. The spring 21 of the preferred embodiment is shown made of round wire spring with a coil 21C portion, but it can be made of flat or round wire spring without a coil, and it can be supported by a different hook (not shown) instead of the semi circled hook 24, or for example it can be attached to the retractable holder 2R by a hinge (not shown) or other rotating joints for providing free rotation to the spring in its retracting movement.

Because the spring 21 is pulled and pushed back through a narrow vertical slot 23 it is preferred to shape the front view of the spring into a curve 28 as shown in the front view 21F of FIG. 5C and the perspective view shown in FIG. 6A, allowing for a smooth movement of the spring 21 through the slot 23. The curve 28 also enables the spring 21 to smoothly slip or slide back into the space between the spring guide plate 20 and the recess mounting box 6 and as will be explained later, the curved arms 21A increase the holding force of the retractable holder 2R in its pushed back position.

During the retractable holder 2R pull out movement it pulls with it the spring 21 by compressing the coil 21C as shown in FIG. 5A and FIG. 6A all the way until the stopper 21S engages the slot 23 for preventing accidental removal of the springs 21 from the spring guide plate 20.

Figure 7B:
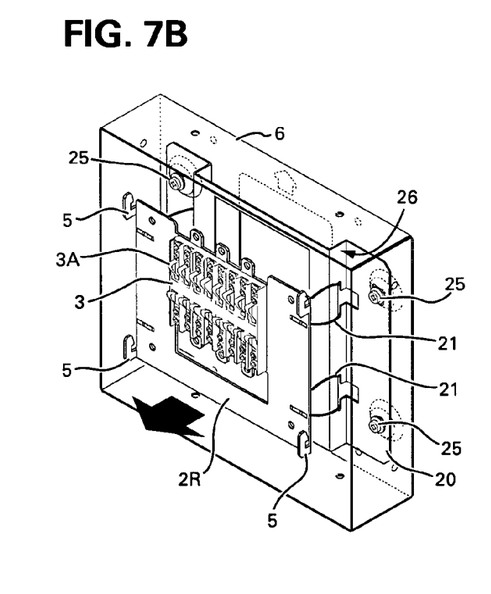
Figure 7C:
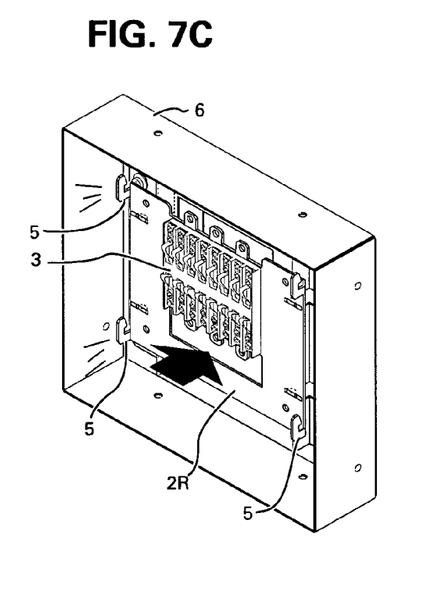

When the retractable holder 2R is fully pulled out the arms 21A of the four springs 21 are bend backward and are forced tightly by the spring recoiling force against the outer 26 edges of the slot 23 as shown in FIG. 4A and FIG. 7B. Pushing back or thrusting the retractable holder 2R toward the spring guide plate 20 thrusts and slip the arms 21A inwards 29 through the slots 23 and releases the combined recoiling forces of all the four springs 21 by engaging the released arms 21A forced against the inner 29 edges of the slots 23, and creating an escalating force that snaps the retractable holder 2R inwards into the mounting box 6 until the rim or frame 113 of the display device 100R is intercepted by the wall 1 shown in FIG. 9C or until the retractable holder 2R is stopped by the spring guide plate 20 shown in FIGS. 4B, 5B, 6B and 7C. Once the springs 21 are slide back into the space between the spring guide plate 20 and the rear of the box 6, the curved arms 21A that are pressured against the rear of the box 6 provide added clutching power to the retractable holder 2R in its push back position, as shown in FIG. 5B.

The recoiling power can be calculated to provide sufficient clutching force, to accommodate the display device 100R size, weight and shape. This can be achieved by using different spring wire diameter, or by selecting the spring material hardness and elasticity. Further the retractable holder 2R is shown as having four springs 21, but it can be attached using only two springs, one on the left and one on the right side of the display device 21.

Alternatively, two springs 21 can attach the retractable holder 2R one on the top and one at the bottom of the retractable holder 2R through a corresponding slots 23 one on the top and one on the bottom of a spring guide plate (not shown). It is similarly possible to provide, for example, in addition to the four springs 21 shown in FIG. 4A, four more springs 21, two on the top and two at the bottom of the retractable holder 2R. This of course by providing additional appropriate slots 23 on the top and the bottom of a spring guide plate (not shown). Therefore, it is also possible for example, in addition to calculating the spring 21 recoiling power and force to increase the number of the springs, each with lower recoiling power or use lesser number but more powerful springs whenever higher holding force is necessary. Or reduce both the number of and the recoiling power of the springs whenever lower holding force is needed.

Another important compression force and power calculation is the consideration for attaching and releasing the display device 100R from the retractable holder 2R. As explained above the first push back of the display device 100R toward the mounting box 6 for attaching (or releasing) the display device onto (or from) the retractable holder 2R is to overcome the resile pressure of the springy contact assembly 3 for releasing the convexes 15A from the latching hooks 5. Accordingly, the force to overcome the pressure of the springy contact assembly 3 should be less than the force required to slip back the springs 21 through the slots 23 or the force needed to overcome the clutching of the springs 21 onto the outer surface 26 of the slots 23 edges, holding the holder 2R in its pulled out position shown in FIG. 4A and FIG. 7B. The difference in the forces enables the push back of the display device 100R onto the retractable holder 2R for attachment (or release) while the retractable holder 2R is in pulled out position. However, it may also be possible to provide a stopper (not shown) for holding the retractable holder 2R in its pulled out position while attaching or removing the display device 100R.

Figure 8A:
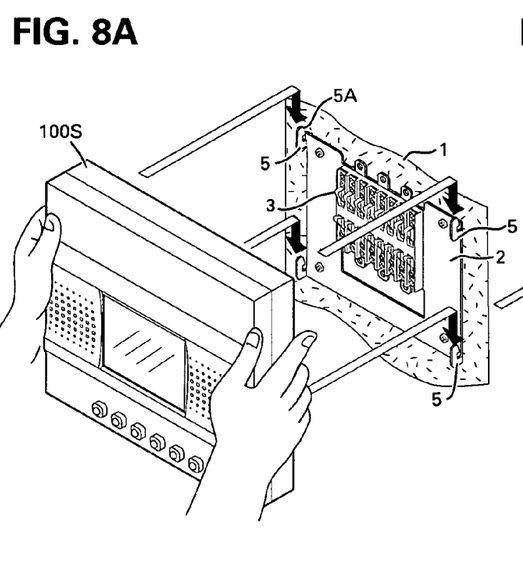
FIGS. 8A, 8B, 8C and 8D are perspective views of the mounting and the removal steps of a surface type display device of the preferred embodiment.
Figure 8B:
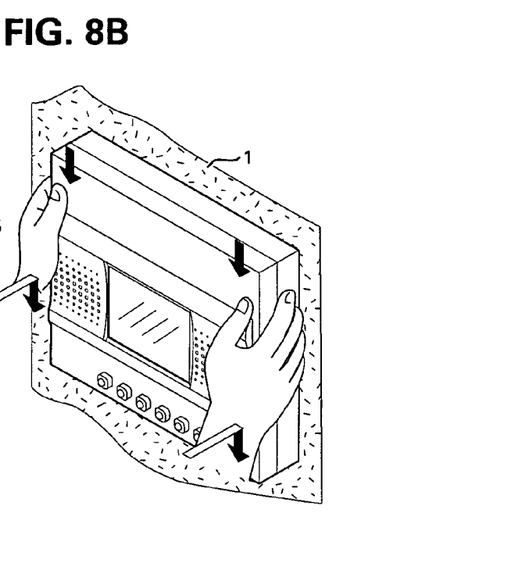

Shown in FIGS. 8A and 8B are the two steps to attach a surface display device 100S onto the holder 2, mounted onto a wall 1. The first step shown in FIG. 8A is to align the sockets 15 of the display device 100S shown in FIG. 1B and step two is to mount the display device 100S and push it onto the holder 2 and slide it downwards as shown in FIG. 8B. By this the display device 100S is latched into place by its convexes 15A and the latches 5A of the hooks 5 and its electrical and signal inter connections are engaged through the springy contacts 3A and the complementary contacts 13A.

Figure 8C:
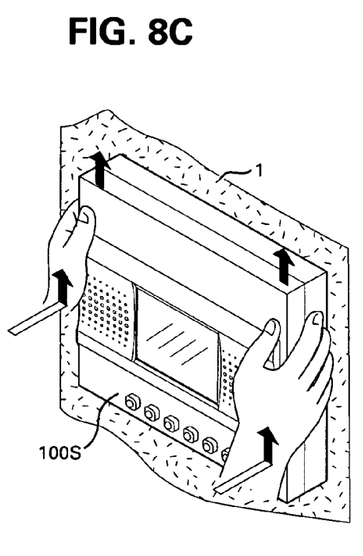

The steps to remove the display device 100S from its holder 2 are as simple, with the first step shown in FIG. 8C is to push back the display 100S toward the wall for releasing the convexes 15A from the latches 5A and sliding the display device upwards.

The releasing step of the display device is another very important item of the invention. Over simplicity of a releasing step may result in accidental release and eventual damage to the display device.

Figure 8D:
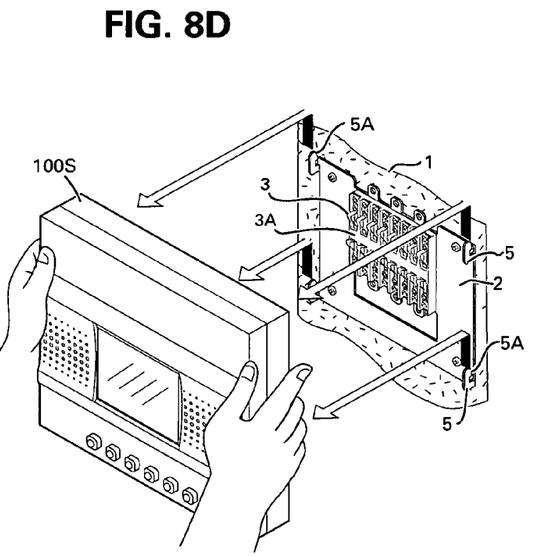

For this reason, the plurality of the latches 5A of the hooks 5 and the complementary convexes 15A of the sockets 15, offer the safety needed against accidental release, whereby all the convexes 15A must be released from all the latches 5A simultaneously, otherwise the upward lifting of the device will be prevented by any one of the latches 5A. Therefore as shown in FIG. 8C the entire display device 100S must be pushed toward the wall 1 in order to release all the convexes 15A from all the four latches 5A and only then can the display be removed from the hooks 5 and pulled out as shown in FIG. 8D, thereby ensuring no accidental release will take place.

Figure 9A:
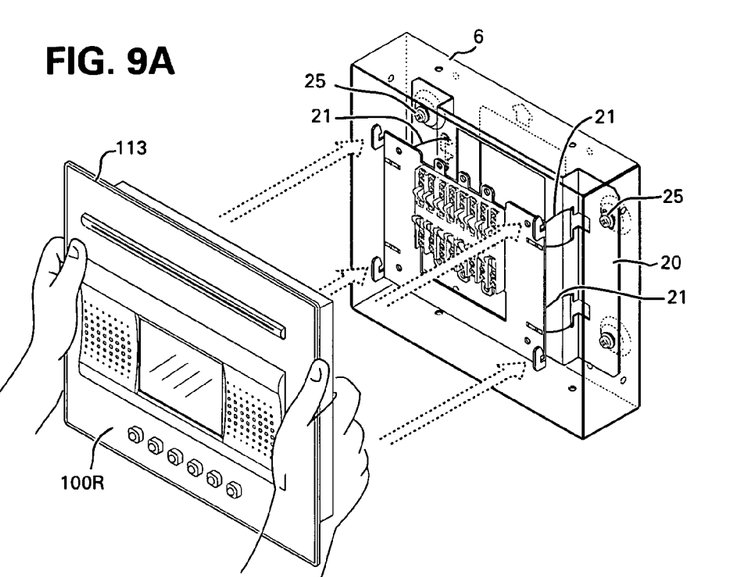
FIGS. 9A, 9B and 9C are perspective views of the mounting steps of a recess type display device of the preferred embodiment.

Shown in FIG. 9A is the first, aligning step, for attaching a recess display device 100R onto the retractable holder 2R, having its four sockets 15 aligned with the hooks 5 of the retractable holder 2R that is clutched in its pull out position, pulled all the way out from the spring guide holder 20 which is attached to the recess mounting box 6 by the screws 25. The retractable holder 2R is clutched in its fully pull out position by the four springs 21 as explained above.

Figure 9B:
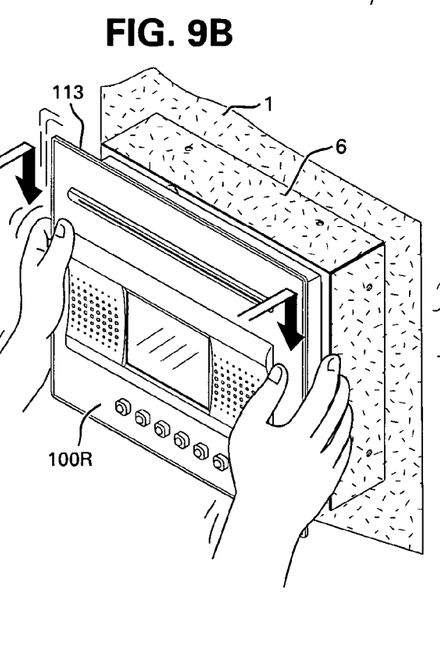

Similar to the attaching of the display device 100S detailed above, the next step to attach the display device 100R is to push the display device 100R onto the retractable holder 2R and slide it downward for locking the convexes 15A of the sockets 15 to the latches 5A of the hooks 5, as shown in FIG. 9B.

Figure 9C:
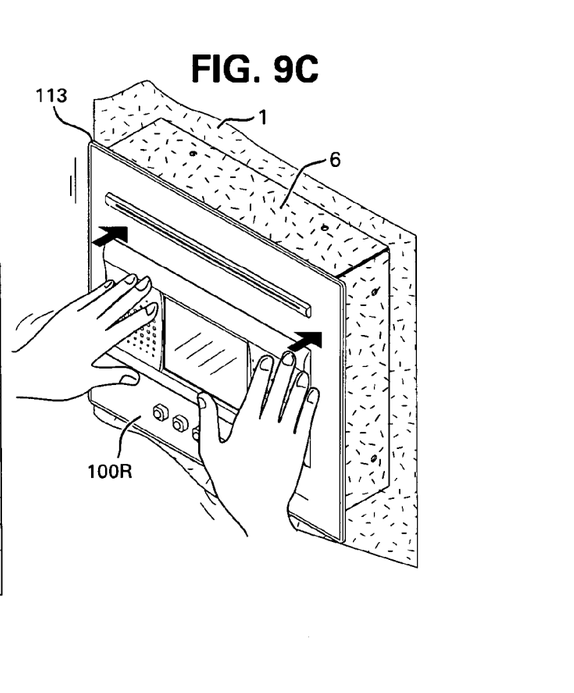

The final step shown in FIG. 9C is the pushing back of the display device 100R onto the wall 1 and into the box 6, and as explained above until the rim or frame 113 is engaged by the wall 1 and the springs 21 are tightly forcing the rim 113 of the display device 100R against the wall 1.

To release and remove the display device 100R from the retractable holder 2R calls first for the pulling out of the display device (attached to the retractable holder 2R) from the mounting box 6 (not shown) and then repeating the steps of pushing the display device toward the retractable holder 2R and sliding it upwards similar to the display device 100S shown in FIGS. 8C and 8D.

Figure 10A:
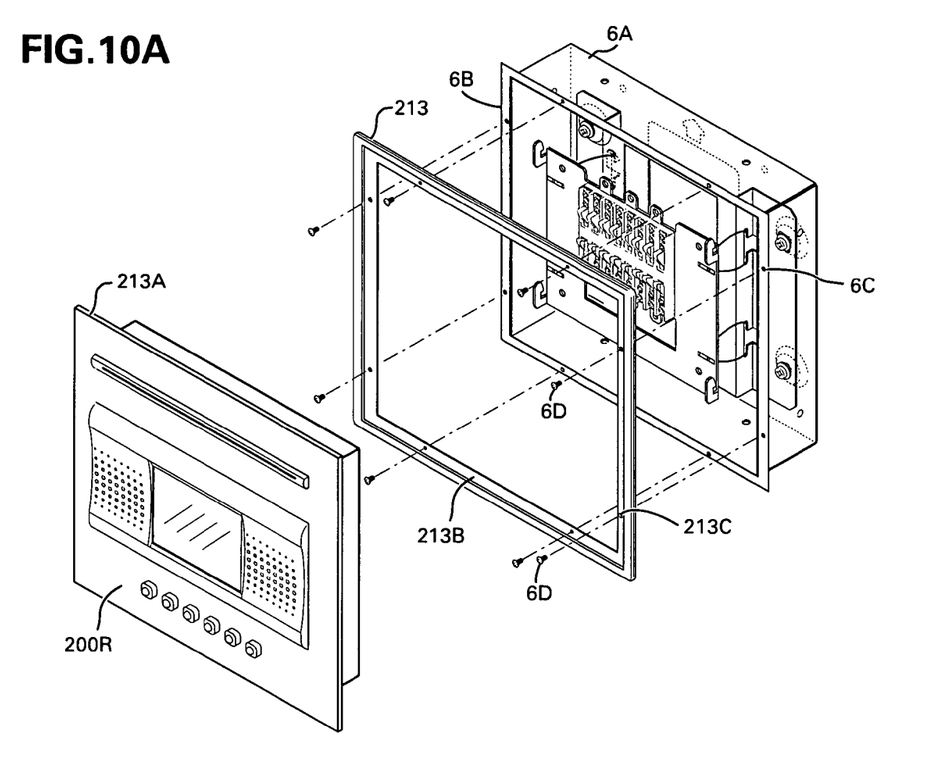
FIGS. 10A and 10B are perspective views of a decorative frame surrounding a recess type display device.

The rim or frame 113, shown touching the wall 1 directly, covers the rim 12 of the box 6. Commonly the immediate surfaces surrounding a recessed mounting boxes, such as box 6, are not perfectly finished and therefore it is preferable to provide wide rim or frame 113 to cover all such imperfectly finished surfaces in the vicinity of the rim 12 of the box 6. Alternatively it is possible to provide a separate decorative frame 213 for fixedly attaching it by screws 6D into the threaded screw holes 6C of the rim 6B of the box 6A shown in FIG. 10A. With such arrangement it is possible to provide a selection of a decorative fit frames, for covering the surfaces immediately surrounding the box 6 (not shown) by attaching such frames onto the wall 1, or surrounding the box 6A, such as the frame 213 shown in the exploded view of FIG. 10A.

Figure 10B:
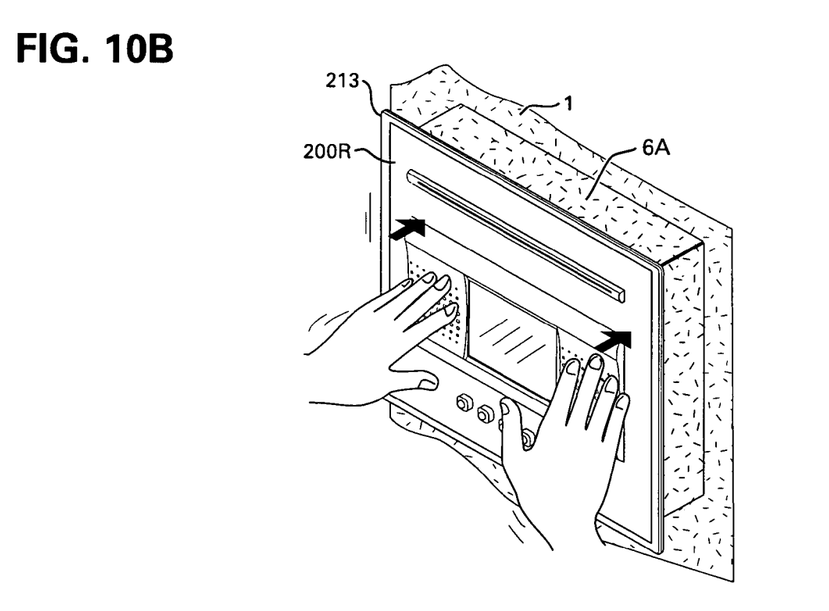

The frame 213 includes notched surface 213B and holes 213C for attaching the frame 213 to the box 6A or to the wall. The notched surface 213B fits the rim 213A of the display device 200R shown in FIG. 10A and therefore the screws 6D or other fasteners that are used are fully covered and cannot be seen when the display device is attached as shown in FIG. 10B. By such arrangement it is possible to offer many frame designs with different esthetics and with different methods for attachment to the boxes or the wall such as hooks, studs, clamps or using such materials as bond or bonding tapes and different facilities for matching the frame with the display devices, thereby accommodating the design needs of architects and interior decorators.

It will of course, be understood by those skilled in the art that the particular embodiment of the invention here presented is by way of illustration only, and is meant to be in no way restrictive, therefore, numerous changes and modifications may be made, and the full used of equivalents resorted to, without departing from the spirit or scope of the inventions as outlined in the appended claims.

What is claimed is:

1. A method for attaching a flat screen display device which is selected from a group consisting of cathode ray tube, liquid crystal, plasma and light emitting diodes included in appliances selected from a group consisting of PC display, data display, graphic display, picture display, television receiver, video monitor, video interphone, video conferencing, video telephone, shopping terminal and a combination thereof, onto a flat surface, which is selected from a group consisting of a wall, pole, partition, framework, skeletal structure, fence, bulkhead and a combination thereof, using a surface mounted holder including a plurality of springy electrical contacts and a plurality of hooks each having a latch, wherein the rear surface of said display device includes a plurality of corresponding electrical contacts for corresponding with the plurality of springy electrical contacts and a plurality of sockets each with a convex corresponding to said plurality of hooks each having a latch, the method comprising the steps of:
   a. mounting said sockets onto said hooks and pushing said display device toward said flat surface by overcoming a biasing force of said springy contacts;
   b. sliding said display device in a direction opposite to the direction of said hooks, until said springy electrical contacts engage said corresponding electrical contacts and every said convex is latched by every said latch, secured by said biasing force for preventing accidental release of said display device.

2. The method according to claim 1, further comprising a step for removing said display device from said surface mounted holder wherein the step comprises
   pushing said display device toward said flat surface by overcoming said biasing force of said springy contacts for releasing every said convex from every said latch; and
   sliding said display device in the direction of said hooks until said hooks are freed from said sockets and said display device can be pulled off.

3. A method for attaching flat screen display device which is selected from a group consisting of cathode ray tube, liquid crystal, plasma and light emitting diodes included in appliances selected from a group consisting of PC display, data display, graphic display, picture display, television receiver, video monitor, video interphone, video conferencing, video telephone, shopping terminal and a combination thereof, onto a recess mounting box embedded into a flat surface, which is selected from a group consisting of a wall, pole, partition, framework, skeletal structure, fence, bulkhead and a combination thereof, said recess mounting box including a spring guide plate for supporting a retractable holder using a plurality of retractable springs having arms and stoppers, rotatably jointed to said retractable holder and extended into complementary slots in said spring guide plate for guiding a movement of said arms and for compressing said springs during pull-out and for applying a released biasing force of said springs onto said arms against the inner surface of said spring guide plate for propelling said retractable holder toward said spring guide plate during a push-back of said display device toward said flat surface, wherein said retractable holder includes a plurality of springy electrical contacts and a plurality of hooks each having a latch, and a rear surface of said display device includes a plurality of corresponding electrical contacts and plurality of sockets each with a convex corresponding to said hooks each having a latch and wherein a front portion of said display device includes a frame, comprising the steps of:
   pulling out said retractable holder from said mounting box until said stoppers engage said slots, said springs are compressed and said arms are extended and forced against the outer surface of said spring guide plate for clutching said retractable holder in its pull out position;
   mounting said sockets onto said hooks and pushing said display device toward said box by overcoming the biasing force of said springy contacts;

sliding said display device in a direction opposite to the direction of said hooks, until said springy electrical contacts engage said corresponding electrical contacts and every said convex is latched by every said latch; and pushing said display device attached to said retractable holder toward said recess mounted box by thrusting said arms inwards through said slots for releasing said clutching and for propelling said retractable holder toward said spring guide plate until said frame engages said flat surface.

4. The method according to claim 3 further comprising a step for removing said display device from said recess mounting box wherein the step further comprises the steps of:

pulling out said display device attached to said retractable holder from said mounting box until said stoppers engage said slots, said springs are compressed and said arms are extended and forced against the outer surface of said spring guide plate for clutching said retractable holder in its pull out position;

pushing said display device toward said retractable holder by overcoming the biasing force of said springy contacts for releasing every said convex from every said latch; and sliding said display device in the direction of said hooks until said hooks are freed from said sockets and said display device can be pulled off.

5. The method according to claim 3 wherein said spring guide plate is attached to said box by screws through screw holes formed to provide level adjustments and wherein said steps further comprise:

loosening said screws for adjusting the level of said spring guide plate inside said box; and fastening said screws to secure said level of said spring guide plate.

6. A combination of flat screen display device which is selected from a group consisting of cathode ray tube, liquid crystal, plasma and light emitting diodes included in appliances selected from a group consisting of PC display, data display, graphic display, picture display, television receiver, video monitor, video interphone, video conferencing, video telephone, shopping terminal and a combination thereof, and a holder for attaching said display device onto a flat surface which is selected from a group consisting of a wall, pole, partition, framework, skeletal structure, fence, bulkhead and a combination thereof, said holder including a plurality of springy electrical contacts and a plurality of hooks each having a latch and the rear surface of said display device includes a plurality of corresponding electrical contacts corresponding to the plurality of springy electrical contacts and a plurality of sockets each with a convex corresponding to said hooks each having a latch wherein said display device is attached to said holder by mounting said sockets onto said hooks and pushing said display device toward said holder by overcoming a biasing force of said springy contacts and sliding said display device in a direction opposite to the direction of said hooks, until said springy electrical contacts engage said corresponding electrical contacts and every said convex is latched by every said latch, secured by said biasing force for preventing accidental release of said display device.

7. The combination according to claim 6 wherein said display device can be removed from said holder by pushing said display device toward said holder by overcoming said biasing force of said springy contacts for releasing every said convex from every said latch and by sliding said display device in the direction of said hooks until said hooks are freed from said sockets and said display device can be pulled off.

8. A combination of flat screen display device which is selected from a group consisting of cathode ray tube, liquid crystal, plasma and light emitting diodes included in appliances selected from a group consisting of PC display, data display, graphic display, picture display, television receiver, video monitor, video interphone, video conferencing, video telephone, shopping terminal and a combination thereof and a recess mounting box for mounting said display device into said box and onto a flat surface selected from a group consisting of a wall, pole, partition, framework, skeletal structure, fence, bulkhead and a combination thereof, said recess mounting box including a spring guide plate for supporting a retractable holder using plurality of retractable springs with arms and stoppers, rotatably jointed to said retractable holder and extended into complementary slots in said spring guide plate for guiding said arms movement during pull-out of said retractable holder from said mounting box until said stoppers engage said slots, said springs are compressed and said arms are extended and forced against the outer surface of said spring guide plate for clutching said retractable holder in its pull out position;

said retractable holder includes plurality of springy electrical contacts and plurality of hooks each having a latch, and the rear surface of said display device includes plurality of corresponding electrical contacts and plurality of sockets each with a convex corresponding to said hooks each having a latch for mounting said sockets onto said hooks and pushing said display device toward said retractable holder clutched in said pull out position by overcoming a biasing force of said springy contacts and sliding said display device in a direction opposite to the direction of said hooks, until said springy electrical contacts engage said corresponding electrical contacts and every said convex is latched by every said latch and secured by said biasing force;

said complementary slots further guide said arms movement during push back of said display device attached to said retractable holder by releasing said clutching and applying the released recoiling force of said springs onto said arms against the inner surface of said spring guide plate for propelling said retractable holder toward said spring guide plate, wherein the front portion of said display device includes a frame and pushing said display device attached to said retractable holder toward said recess mounting box by thrusting said arms back through said slots for releasing said clutching propels said retractable holder toward said spring guide plate until said frame engages said flat surface.

9. The combination according to claim 8 wherein said display device can be removed from said box by pulling out said display device attached to said retractable holder from said mounting box until said stoppers engage said slots, said springs are compressed and said arms are extended and forced against the outer surface of said spring guide plate for clutching said retractable holder in its pull-out position, wherein a pushing of said display device toward said retractable holder clutched in said pull out position overcomes the biasing force of said springy contacts and releases every said convex from every said latch and wherein the sliding of said display device in the direction of said hooks frees said hooks from said sockets and said display device can be pulled off.

10. The combination according to claim 8 wherein said spring guide plate is attached to said box by screws through screw holes formed to provide level adjustments when said screws are loosened.

11. The combination according to claim 8 wherein said clutching force is stronger than said biasing force.

12. The combination according to claim 8 further comprise a decorative frame with a notched surface for mounting said decorative frame onto said box or onto said flat surface using fasteners selected from a group comprising clamps, hooks, studs, screws, bond, bonding materials and a combination thereof, wherein all said fasteners that are visible are confined to said notched surface and wherein said frame of said front portion covers said notched surface when said display device is pushed back onto said box.

* * * * *